US007197626B2

(12) United States Patent
Jaffrey

(10) Patent No.: US 7,197,626 B2
(45) Date of Patent: *Mar. 27, 2007

(54) PLURAL MICROCONTROLLERS FOR MANAGING CPU ALLOCATION AND DEVICE RESOURCES INCLUDING ESTABLISHING CONNECTIONS WITHOUT A CENTRALIZED OPERATING SYSTEM

(76) Inventor: Syed Kamal H. Jaffrey, 56, Bigelow Ave., #23, Watertown, MA (US) 02472

(*) Notice: Subject to any disclaimer, the term of this patent is extended or adjusted under 35 U.S.C. 154(b) by 580 days.

This patent is subject to a terminal disclaimer.

(21) Appl. No.: 10/444,768

(22) Filed: May 23, 2003

(65) Prior Publication Data

US 2003/0200354 A1    Oct. 23, 2003

Related U.S. Application Data

(63) Continuation of application No. 09/770,810, filed on Jan. 26, 2001, now Pat. No. 6,591,358.

(51) Int. Cl.
*G06F 13/12* (2006.01)
(52) U.S. Cl. .................... 712/32; 700/20; 710/104
(58) Field of Classification Search .................. None
See application file for complete search history.

(56) References Cited

U.S. PATENT DOCUMENTS

| | | | | |
|---|---|---|---|---|
| 4,831,525 A | 5/1989 | Saito et al. | ................ | 717/107 |
| 4,961,131 A | 10/1990 | Ashida | ........................ | 700/23 |
| 5,412,798 A | 5/1995 | Garney | ...................... | 709/321 |
| 5,428,787 A | 6/1995 | Pineau | ........................ | 713/1 |
| 5,490,272 A | 2/1996 | Mathis et al. | ............... | 709/108 |
| 5,526,523 A | 6/1996 | Straub et al. | ............... | 713/100 |
| 5,559,965 A | 9/1996 | Oztaskin et al. | ............ | 710/104 |
| 5,574,886 A | 11/1996 | Koike et al. | ................... | 703/1 |
| 5,634,074 A | 5/1997 | Devon et al. | .................. | 716/8 |

(Continued)

OTHER PUBLICATIONS

International Search Report for PCT/US 02/02310. Mailed on Jun. 13, 2002.

(Continued)

*Primary Examiner*—Kenneth S. Kim
(74) *Attorney, Agent, or Firm*—A. Jason Mirabito; Mintz, Levin, Cohn, Ferris, Glovsky and Popeo, P.C.

(57) ABSTRACT

A hardware/firmware layer comprising a Device Manager, an Information Manager, a Memory Manager, and a Process Manager contained in one or more semiconductor chips is disclosed. The hardware/firmware layer eliminates the need for an operating system. Each of the Managers comprises a microcontroller associated with a firmware embedded in ROM or Flash memory that contains instruction sets that cause the microcontroller to provide a designated task of device management, information management, memory management and process management. In another aspect of the invention, devices connected to the computer system are "smart devices," each device having a device microcontroller and embedded device drivers in a ROM or Flash memory. The hardware/firmware of the present invention does not need to search for available devices, provide diagnostic tests or obtain device drivers to communicate with the devices. Instead, the device microcontroller uses the embedded device driver to perform configuration and self diagnostic test as well as device operations. If the device is operational, the device microcontroller sends an identification signal to the hardware/firmware layer of the present to indicate availability of the device.

16 Claims, 16 Drawing Sheets

U.S. PATENT DOCUMENTS

| | | | |
|---|---|---|---|
| 5,715,456 A | 2/1998 | Bennett et al. | 713/2 |
| 5,742,825 A | 4/1998 | Mathur et al. | 709/309 |
| 5,748,980 A | 5/1998 | Lipe et al. | 710/8 |
| 5,764,922 A * | 6/1998 | Peacock et al. | 710/6 |
| 5,802,265 A | 9/1998 | Bressoud et al. | 714/11 |
| 5,819,112 A | 10/1998 | Kusters | 710/36 |
| 5,835,964 A | 11/1998 | Draves et al. | 711/207 |
| 5,878,276 A | 3/1999 | Aebli et al. | 710/19 |
| 5,935,224 A | 8/1999 | Svancarek et al. | 710/63 |
| 5,937,200 A | 8/1999 | Frid et al. | 710/264 |
| 5,960,087 A | 9/1999 | Tribble et al. | 713/167 |
| 5,999,989 A | 12/1999 | Patel | 710/1 |
| 6,049,854 A | 4/2000 | Bedarida | 711/153 |
| 6,061,695 A | 5/2000 | Slivka et al. | 715/513 |
| 6,105,074 A | 8/2000 | Yokote | 709/328 |
| 6,108,715 A | 8/2000 | Leach et al. | 709/330 |
| 6,145,021 A | 11/2000 | Dawson et al. | 710/8 |
| 6,154,836 A | 11/2000 | Dawson, III | 713/1 |
| 6,154,838 A | 11/2000 | Le et al. | 713/2 |
| 6,189,049 B1 | 2/2001 | Klein | 710/1 |
| 6,189,050 B1 | 2/2001 | Sakarda | 710/18 |

OTHER PUBLICATIONS

Compaq Computer Corporation, Phoenix Technologies, Ltd. Intel Corporation, Plug and Play BIOS Specification, Version 1.0A, May 5, 1994.

Plug and Play ISA Specification, Version 1.0a, May 5, 1994.

* cited by examiner

- 192 — PROGRAM REQUEST.
- 194 — PROCESS REQUEST
- 196 — MEMORY REQUIREMENT EXCHANGE.
- 198 — PROGRAM DISPATCHING, INITIATING, MONITORING.
- 202 — PROGRAM FILE IDENTIFICATION.
- 204 — MEMORY MANAGEMENT, ALLOCATION AND TRACKING.
- 206 — STORAGE INFORMATION.
- 208 — IN-PROCESS FILE REQUEST, QUEUING AND DELIVERY
- 212 — FURTHER INPUT REQUEST.
- 212 — FURTHER INPUT.
- 214 — FILE LOCATION AND INFORMATION EXCHANGE.

```
222 — FILE SUPPLIED FOR OUTPUT.
224 — OUTPUT INITIATION REQUEST.
226 — READY / WAIT SIGNAL.
228 — JOB LOAD (IF READY SIGNAL RECEIVED), QUEUE LOAD (IF WAIT SIGNAL).
```

232 — FILE INFORMATION OR TRANSFER REQUEST.
234 — FILE INFORMATION.
       FILE TRANSFER INSTRUCTION.
236 — FILE TRANSFER STORAGE A TO B

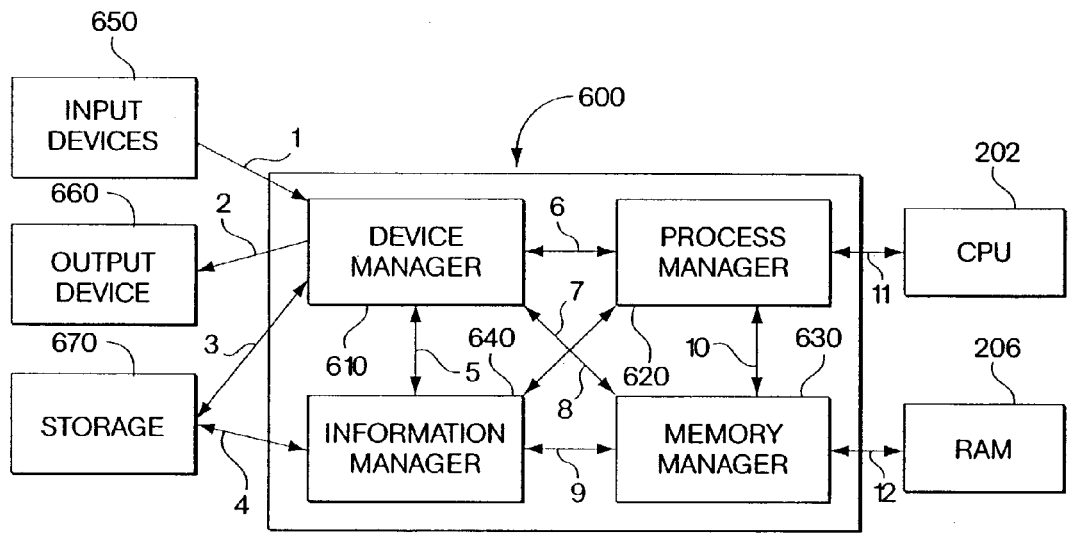

Fig. 24

1. PROCESS REQUESTS (PROGRAM, DATA OR FILE INFORMATION).
2. OUTPUT REQUESTS (e.g. QUEUING) OR OUTPUT SUPPLY.
3. FILE TRANSFER REQUEST OR ACTUAL FILE TRANSFER.
4. FILE RECORD INTERROGATION.
5. FILE INFORMATION REQUESTS/EXCHANGE.
6. PROCESS INPUT/OUTPUT REQUESTS AND EXCHANGE.
7. FILE REQUESTS AND EXCHANGE.
8. PROCESS USE AND PROCESS CAPACITY INFORMATION.
9. MEMORY USE AND MEMORY CAPACITY INFORMATION.
10. PROCESS MEMORY REQUIREMENTS AND CAPACITY EXCHANGE AND MOMORY REGISTER ALLOCATION.
11. PROGRAM DISPATCHING, INITIATING AND MONITORING.
12. MEMORY ALLOCATION, MANAGEMENT AND TRACKING.

Fig. 25

PLURAL MICROCONTROLLERS FOR MANAGING CPU ALLOCATION AND DEVICE RESOURCES INCLUDING ESTABLISHING CONNECTIONS WITHOUT A CENTRALIZED OPERATING SYSTEM

This application is a continuation application of U.S. patent application Ser. No. 09/770,810 filed Jan. 26, 2001 now U.S. Pat. No. 6,591,358, to which priority is hereby expressly claimed.

BACKGROUND OF THE INVENTION

1. Field of the Invention

The invention relates to computer architecture, hardware and method and in particular, to computer architecture, hardware and method that eliminates the need for an operating system.

2. Background of the Invention

FIG. 1 illustrates a conventional computer system architecture 100 comprising a hardware platform layer 200, a firmware layer 300, an operating system layer 400 and an application programs layer 102. The hardware platform layer 200 is the physical layer of the computer system that performs the actual operations of the computer system. The firmware layer 300 performs, among others, the interface between the hardware platform layer 200 and the operating system layer 400. The operating system layer 400 is a software layer that performs the management of the computer resources such as processor resource management, memory allocation management, device resources management, and data file management. The operating system is also the base upon which application programs are built. The application programs layer 102 comprises computer programs that provide instruction sets that manipulate and/or process data in accordance with a desired result. Examples are word processor, database, spread sheet and web browser programs.

FIG. 2 illustrates a conventional hardware platform layer, also commonly referred to as a "computer" 200 of a computer system comprising a central processing unit (CPU) 202, a read only memory (ROM) 204 and a main memory 206 coupled together through a system bus 208. The illustrated configuration is representative of a bus architecture type computer system that is commonly used and includes Personal Computer Interface (PCI), Industry Standard Architecture (ISA), Extended ISA (ESIA) and other bus standards. The computer 200 need not be limited to a bus architecture and may use a different architecture. The computer 200 further comprises various controllers such as a memory controller 212, a direct memory access (DMA) controller 214, an interrupt controller 216, an input/output (I/O) controller 218, an integrated drive electronics/floppy drive controller (IDE/FDC) controller 222 and a video controller 224, among others. Various devices are coupled to the controllers so that the computer 200 can interact with a user or with the outside world. For instance, a video monitor 226 is coupled to the video controller 224 to display various information, a keyboard 228 and a pointing device 232 is coupled to the I/O controller 218 via a serial port to input data and commands to the computer 200, a printer 234 is also coupled to the I/O controller 218 via a parallel port to generate hard copies of data requested by the user. The IDE/FDC controller 222 controls various disk drives such as a diskette drive 236, a hard-disk drive 238, a compact disc (CD) ROM drive 242 and a digital video disc (DVD) ROM drive 244 and a modem 246 provides communication to the outside world such as the Internet. Typically, the hardware has one or more expansion slots 248 to receive various expansion cards that enhance or add features of the hardware platform, thus a modem card 246 may be inserted into the expansion slot 248 to provide a communications feature.

The firmware layer such as a Basic Input Output Operating System (BIOS) 300 may be located in the ROM 204 and is generally specific to the hardware platform of the computer that it supports. The BIOS routines include various setup procedures and Power On Self Test (POST). The various setup procedures include the configuration of the various controllers in which the BIOS acts as an uniform interface between the controllers and the operating system, thus allows the operating system to access the hardware platform 200. The BIOS supports the interchange of data that uses the various controllers, devices such as keyboard, mouse, video monitor, disk drives, printer and so forth. Other setup procedures include preliminary memory setup for the operating system, fault handling, clock and timers for various circuits, for example, the dynamic random access memory (DRAM) refresh circuit that refreshes the DRAMs that comprise the main memory. The POST performs various self-test on the memory and controllers and if a fault is find during the self-test, an error message in a form of an audio beep and/or a error message is displayed.

FIG. 3 is a flow chart of an exemplary power-up sequence using the BIOS that may conform to Compaq Computer Corporation, Phoenix Technologies Ltd. and Intel Corporation, *Plug and Play BIOS Specification*, Version 1.0a, May 5, 1994, which is incorporated herein by reference. The BIOS may also conform to Intel Corporation and Microsoft Corporation, *Plug and Play ISA Specification*, Version 1.0a, May 5, 1994, which is incorporated herein by reference. Plug & Play (PnP) specification allows for a computer operated configuration of devices attached to the computer without manual manipulation by a user. The user can add a new device, such as a sound card, and the computer will automatically detect the device and provide a device driver to operate the card (which may include requesting the user to insert a disk or a CD that contains the device driver if the computer does not already have the driver internally). A PnP conforming device usually has the characteristics of being able to uniquely identify itself; indicate the services it provides and the resources it requires; identify the device driver that supports it; and an operating system to control the device. These features are important to the operating system in that they allow the operating system to establish a working configuration for all devices connected to the computer and to load appropriate device drivers into memory.

Device drivers are software modules comprising logic for controlling the low level or specific components of a device, thus allowing the operating system to control the device. For example, a device driver may be used for controlling a magnetic disk drive coupled to the computer. In this example, the device driver will control various hardware specific registers, latches, signals or other components of the magnetic disk drive device. A device driver is usually specifically configured to communicate with a particular device.

Referring now to FIG. 3, according to one power-up sequence, at stage 302, the computer is powered on or a reset signal is received in which the computer forces the components within the computer including accessible devices to a reset logic state. At reset logic state, the computer does not "know" its actual configuration including what devices including those on the expansion cards are attached to the computer. After a predefined period of time has passed in which the power supply has stabilized, at stage 304, the CPU starts at a starter address that points to the ROM in which the BIOS is located. The POST routine of the BIOS is initiated and it tests the dynamic random access memories (DRAMS) that make up the main memory along with certain devices and components of the system to determine their operability. During the testing process, a copy of the BIOS is retrieved from the ROM and is shadowed into the main memory. The BIOS has a set of instruction routines that prepares the computer system to receive the operating system from an initial load device (IPL) which may be a disk drive. At stage 306, the BIOS attempts turn off all the devices to determine which devices (i.e. IPLs) may be used to find and launch the operating system. IPLs are detected at this stage because IPLs cannot be turned off. At stage 308, the BIOS turns on the devices and places non-IPLS in wait state to be initialized by the operating system. At stage 310, the BIOS executes a bootstrap routine that causes the kernel of the operating system (usually contained in the hard-disk drive) to load into the main memory. At this stage, the hardware control by the firmware (i.e., the BIOS) is passed to the software (which is the kernel). The kernel 402 provides the core function of the operating system which is computer resource management such as process execution, memory management, dynamic linked library management, scheduling, file system management, I/O services and user interface presentation, among others.

At stage 312, the kernel initiates an isolation procedure that isolates the devices individually. The key to the isolation protocol is that each device contains a unique 72-bit number known as a serial identifier. Once a device is isolated, it is assigned a Card Serial number (CSN) that is unique to the assigned device and serves as a "handle" in which the operating system identifies the device and with which the device identifies itself, for instance when generating an interrupt. At stage 314, the kernel reads the isolated devices individually for resource requirements of the device. The resources required by the devices include DMA, interrupt request (IRQs), I/O and memory addresses. At stage 316, the kernel creates a comprehensive list of the resource requirements of each device. At stage 318, because the kernel knows the available system resources, the kernel allocates the available resources to the devices as needed while ensuring the resource allocation is non-conflicting. At stage 320, as the kernel allocates system resources to the devices an allocation map is created and stored in memory. In addition to the creation of the allocation map, At stage 322, using the identification number provided by the device, the kernel identifies the associated device driver that is usually stored in the hard-disk drive. Should the device driver be unavailable, the kernel will prompt the user to provide the device driver. All device drivers associated with the detected devices are loaded into the main memory which is used by the kernel to control the devices. Further details of the power-up sequences may be found in *Plug and Play ISA Specification*. The isolation, interrogation of the various devices and loading of the device drivers into the main memory is time consuming and also reduces the available main memory.

FIG. 4 illustrates a schematic diagram of an operating system 400 comprising a kernel 402, a device drivers layer 404, an application program interface (API) 406 and a library layer 408. The kernel 402 provides the core function of the operating system as mentioned with respect to FIG. 3. Application programs directly or indirectly rely on these and other capabilities of the kernel and other portions of the operating system. The device drivers layer 404 contains the device drivers necessary to control and communicate with devices. The operating system also provides the interface between the hardware and the application programs layer. To facilitate development of application programs, the operating system also includes application program interfaces (APIs) 406 to interact with application programs. An API is a set of routines that application programs use to access lower level services performed by the operating system. The operating system performs a number of services for the application programs including module management, inter-process communication (IPC) and scheduling. Another service provided is the dynamic linked libraries (DLL) contained in the library layer 408. The operating system performs module management by supporting the linking, loading and execution of DLLs available in the library layer.

The operating system also organizes the instructions from application programs into chunks called threads. A thread can be thought of as a packet of instructions that can be "chewed" for execution by the CPU. The operating system breaks the operation of multiple application programs into threads for sequential execution thus allowing the CPU to simultaneously support several application programs known as multi-tasking. Multi-tasking in one example increases the speed of a computers operation by allowing various devices to operate without idling the CPU. Usually, the CPU executes instructions much more quickly than data can be read and written into a storage device. Thus, the CPU would be idle if it had to wait for data to be written or read from a storage device. The use of threads allow the operating system to reassign the CPU whenever a task must be performed for a slow component of the system. For example, the processing of instructions from a first application program may be suspended whenever data must be read from a disk drive. The CPU may then execute a thread from another application program while the data is being read, and resume processing of the instructions from the first application program, once the data has been read.

The computer using a bus architecture usually has one bus in which the CPU and the various devices communicate through. Thus, the operating system controls a flow of instructions to the CPU from application programs, and temporal suspension of CPU processing of application program instructions to allow for the I/O communication by various devices such as the data transfer from the disk drive to the main memory via the DMA controller.

The computer system using an operating system described above has an undesirable lengthy power-up sequence that inconveniences the user and consumes valuable memory space. A known method uses a faster CPU to speedup the power-up sequence. However, a faster CPU is expensive and increases the cost of the computer. The computer system relying on the operating system is subject to "crashes" perhaps due to a tainted application program it had executed, or due to errors resulting from handling numerous interrupts and call procedures during multi-tasking. In addition, the operating system is subject to virus attacks that may render the computer system inoperational as well as destroying valuable data files. What is needed is a computer system and method that solves these and other shortcomings.

SUMMARY OF THE INVENTION

Embodiments of the present invention provides computer architecture, hardware and method that eliminates a need for an operating system.

In one general aspect, a computer system comprises a central processing unit (CPU), a main memory, a further unit that includes a first microcontroller and a first memory containing a first set of instructions configured to cause the microcontroller to manage CPU operations, and a plurality of trace links connecting the further unit to the CPU and the main memory to facilitate communication between the further unit, the CPU and the main memory. Other features include at least one device, a trace link connecting the device to the further unit, and the further unit further includes a second microcontroller and a second memory containing a second set of instructions configured to cause the second microcontroller to manage the device; the further unit further includes a third microcontroller and a third memory containing a third set of instructions configured to cause the third microcontroller to manage memory operations; the further unit further includes a fourth controller and a fourth memory containing a fourth set of instructions configured to cause the fourth controller to manage data operations; the plurality of microcontrollers in the further unit are connected together to communicate with each other; the further unit includes a cross-bar switch to connect the plurality of microcontrollers; the device includes a fifth microcontroller and a fifth memory containing a fifth set of instructions configured to cause the fifth microcontroller to control the device operations, the fifth microcontroller in communication with at least the second microcontroller; the fifth set of instructions in the fifth memory further configured to cause the fifth microcontroller to test the device and if the device is operational the fifth set of instructions is configured to cause the fifth microcontroller to signal at least the second microcontroller to indicate availability of the device; the fifth set of instructions in the fifth memory further configured to cause the fifth microcontroller to signal at least the second microcontroller to indicate availability of the device includes sending device identification and required resource data; the second set of instructions in the second memory further configured to cause the second microcontroller to receive the signal indicating availability of the device and allocating available resources to the device.

In another aspect of the invention an apparatus for managing computer operations comprises a first microcontroller and a first memory containing a first set of instructions configured to cause the microcontroller to manage central processing unit (CPU) operations.

Other features include a second microcontroller and a second memory containing a second set of instructions configured to cause the second microcontroller to manage device operations; a third microcontroller and a third memory containing a third set of instructions configured to cause the third microcontroller to manage memory operations; a fourth controller and a fourth memory containing a fourth set of instructions configured to cause the fourth controller to manage data operations; the plurality of microcontrollers are connected together to communicate with each other; a cross-bar switch to connect the plurality of microcontrollers; wherein the memory is a read only memory (ROM); wherein the memory is an erasable programmable ROM (EPROM); wherein the memory is a Flash memory; wherein the microcontrollers are digital signal processors (DSPs); wherein the apparatus is contained in a semiconductor chip; a device including a fifth microcontroller and a fifth memory containing a fifth set of instructions configured to cause the fifth microcontroller to control the device operations, the fifth microcontroller in communication with at least the second microcontroller; the fifth set of instructions in the fifth memory further configured to cause the fifth microcontroller to test the device and if the device is operational the fifth set of instructions is configured to cause the fifth microcontroller to signal at least the second microcontroller to indicate availability of the device; the fifth set of instructions in the fifth memory further configured to cause the fifth microcontroller to signal at least the second microcontroller to indicate availability of the device includes sending device identification and required resource data; the second set of instructions in the second memory further configured to cause the second microcontroller to receive the signal indicating availability of the device and allocating available resources to the device.

In another aspect of the invention a device for use in a computer system that eliminates a need for an operating system comprises device circuitry, a first microcontroller and a memory containing a set of instructions configured to cause the microcontroller to control device circuitry, the instructions further configured to facilitate the microcontroller to communicate with a second microcontroller that manages a central processing unit (CPU) operation.

BRIEF DESCRIPTION OF THE DRAWING

For better understanding of the invention, reference is made to the drawings that are incorporated herein by reference and in which:

FIG. 24 and FIG. 25 illustrate in general combined Manager interfaces and interactions to perform computer operations in accordance with an embodiment of the invention.

DETAILED DESCRIPTION OF THE INVENTION

The invention relates to hardware/firmware layer in a computer system that eliminates a need for an operating system. In one aspect of the invention, the hardware/firmware layer comprises a Device Manager, an Information Manager, a Memory Manager, and a Process Manager, which may be contained in one or more semiconductor chips. Each of the Managers comprises a microcontroller associated with firmware embedded in ROM or Flash memory that contains instruction sets that cause the microcontroller to provide a designated task of device management, information management, memory management and process management. The semiconductor chip or chip sets, when incorporated into the computer motherboard allows the computer hardware to operate without an operating system. In another aspect of the invention, devices such as disk drives, modem, printer, video monitor, connected to the computer system are "smart devices," wherein each device has a device microcontroller and embedded device drivers in a ROM or Flash memory. The is a semiconductor chip used in a computer system without an operating system does not need to search for available devices, provide diagnostic tests or obtain device drivers to communicate with the devices. Instead the device microcontroller uses the embedded device driver to perform configuration and self diagnostic test autonomously as well as operations of the device. If the device is operational, the device microcontroller sends an identification signal that includes resource requirements to the semiconductor chip used in a computer system without an operating system chip via trace links on the motherboard to indicate availability of the device.

Figure 1:
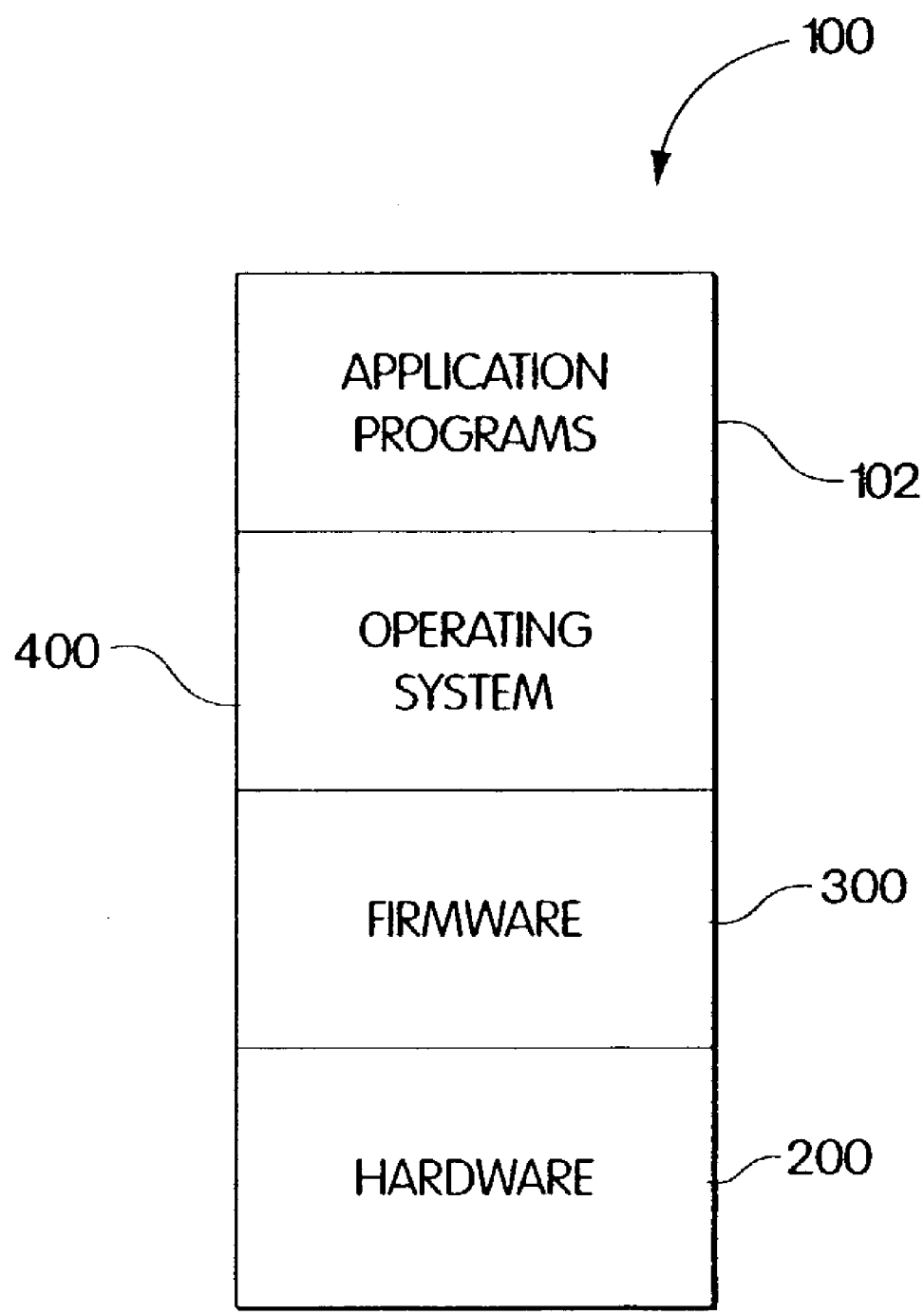
FIG. 1 illustrates a conventional computer system architecture.
Figure 2:
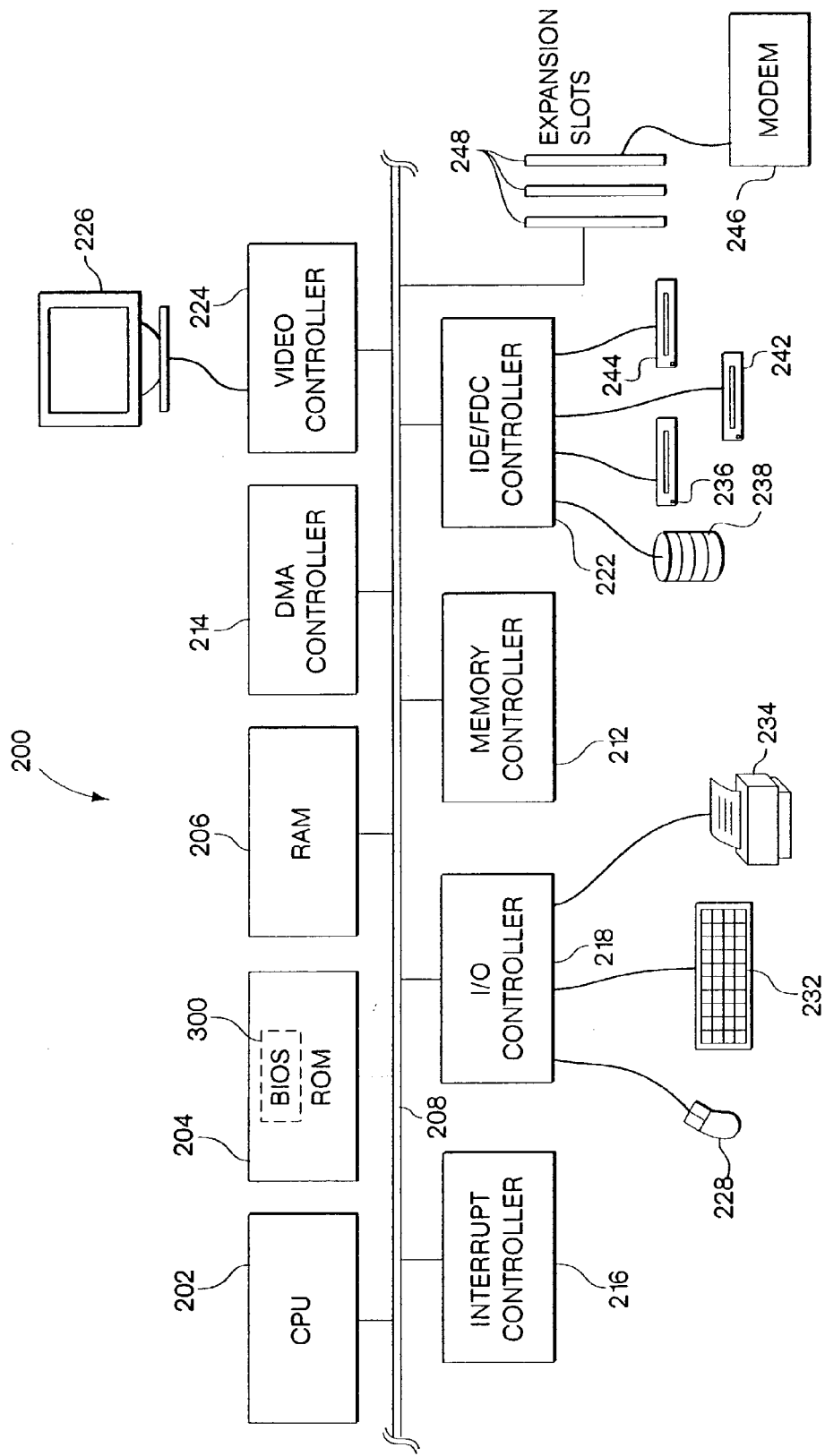
FIG. 2 illustrates a conventional hardware platform layer of the computer architecture of FIG. 1.
Figure 3:
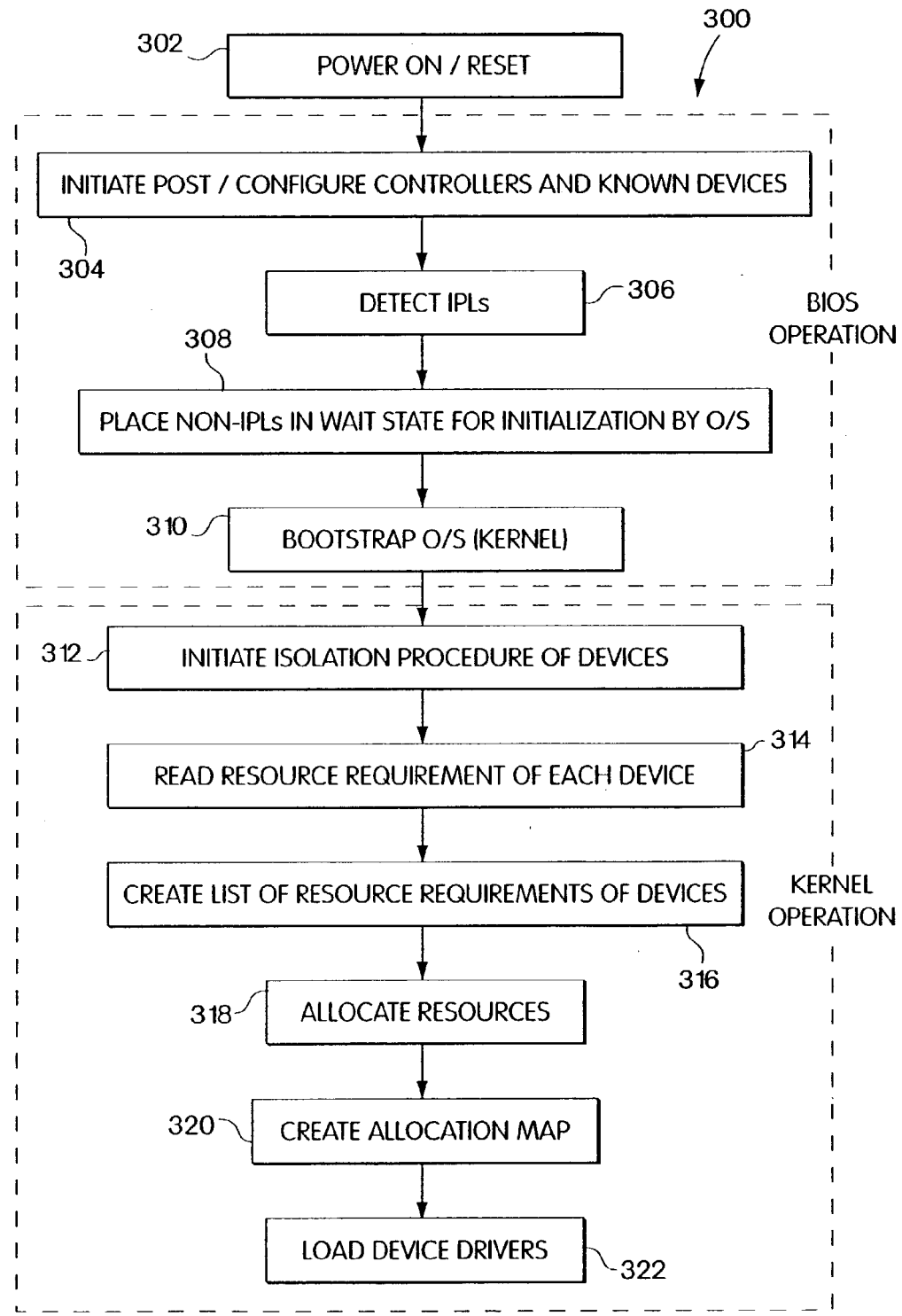
FIG. 3 is a flow diagram of a conventional Basic Input Output System (BIOS) and kernel start-up operation.
Figure 4:
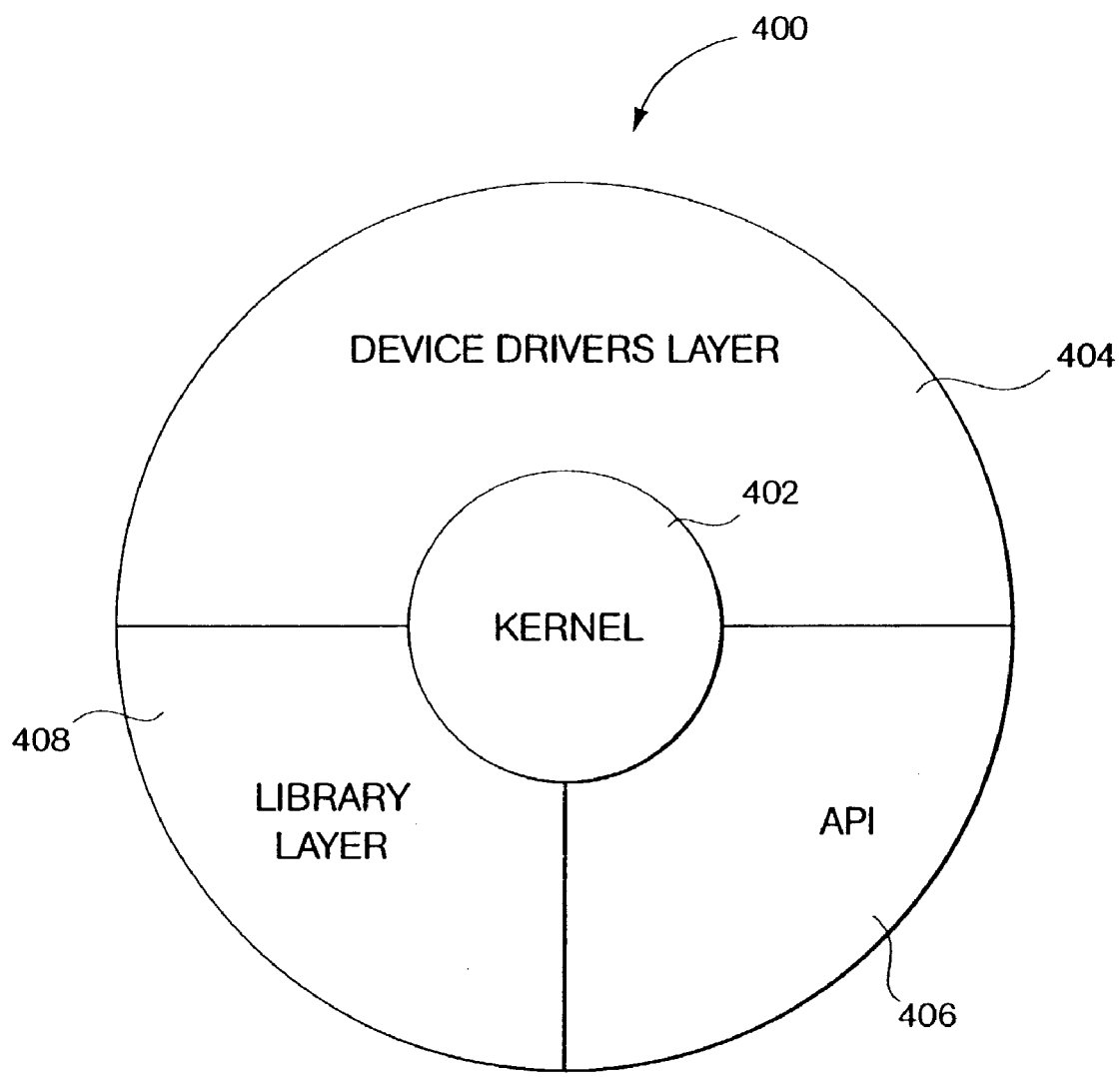
FIG. 4 illustrates a conventional operating system.
Figure 5:
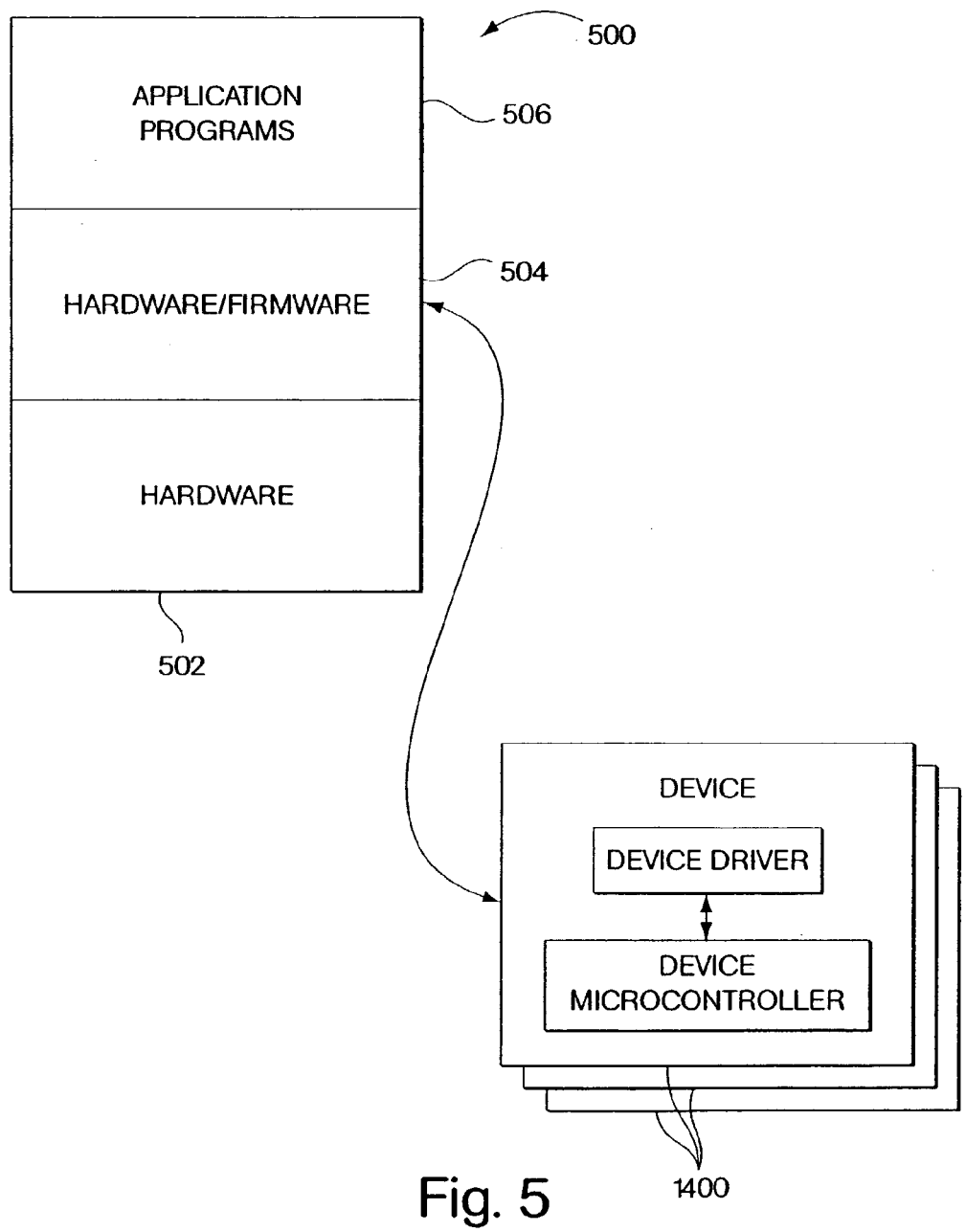
FIG. 5 illustrates a computer architecture with hardware/firmware layer that eliminates the need for an operating system.

FIG. 5 is a high-level layer diagram of computer architecture 500 containing a hardware/firmware layer 504 that eliminates a need of an operating system in accordance with an embodiment of the invention. The architecture also comprises a hardware platform layer 502 and an application programs layer 506. The hardware platform layer 502 is similar to a conventional hardware platform layer shown in FIG. 2. However, as will be apparent with respect to FIG. 13, modifications are made to the hardware platform layer to allow for the various hardware components and devices such as disk drives, modems, printer, video monitor to interact with the hardware/firmware layer 604. The application programs layer 506 is similar to the conventional application programs layer shown in FIG. 1 and may include application programs such as word processor, database, spread sheet, browser and so forth.

Figure 6:
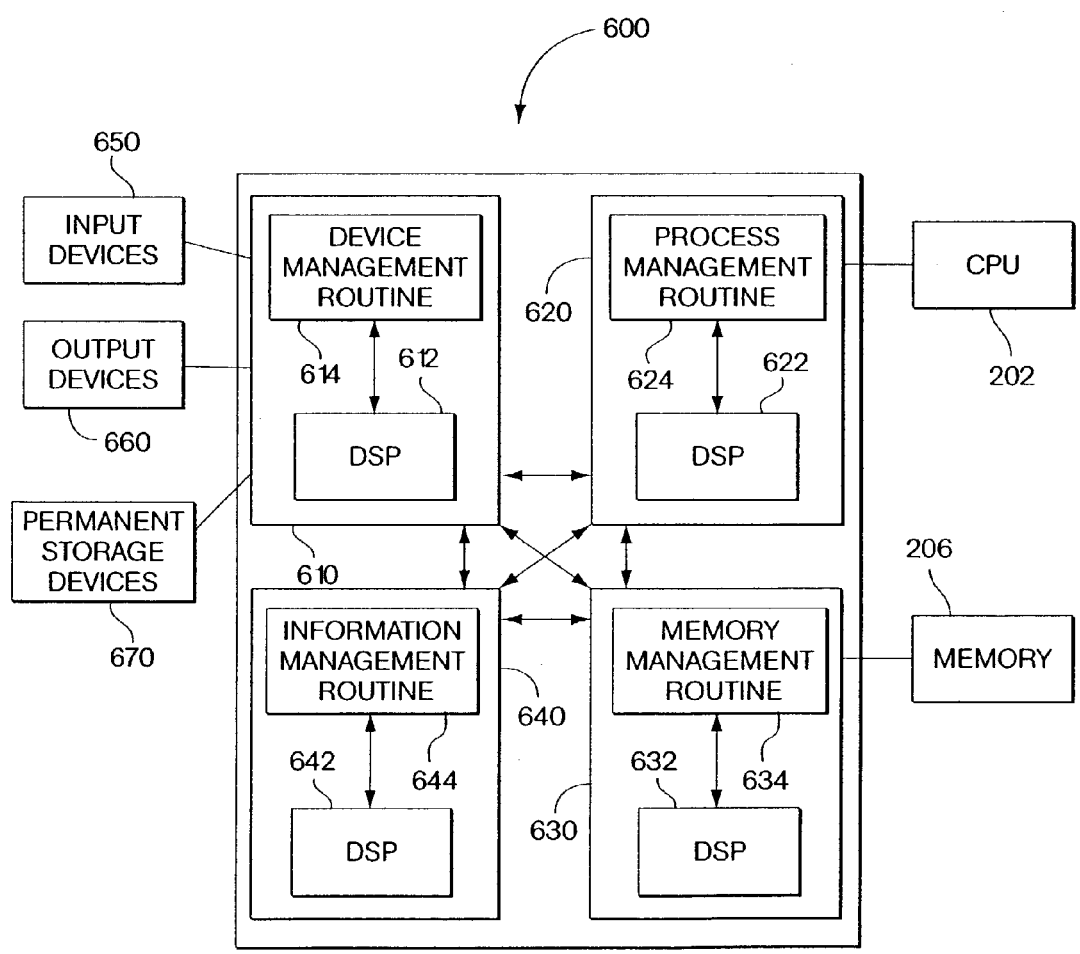
FIG. 6 is a semiconductor chip used in a computer system without an operating system in accordance with one embodiment of the invention.
Figure 7:
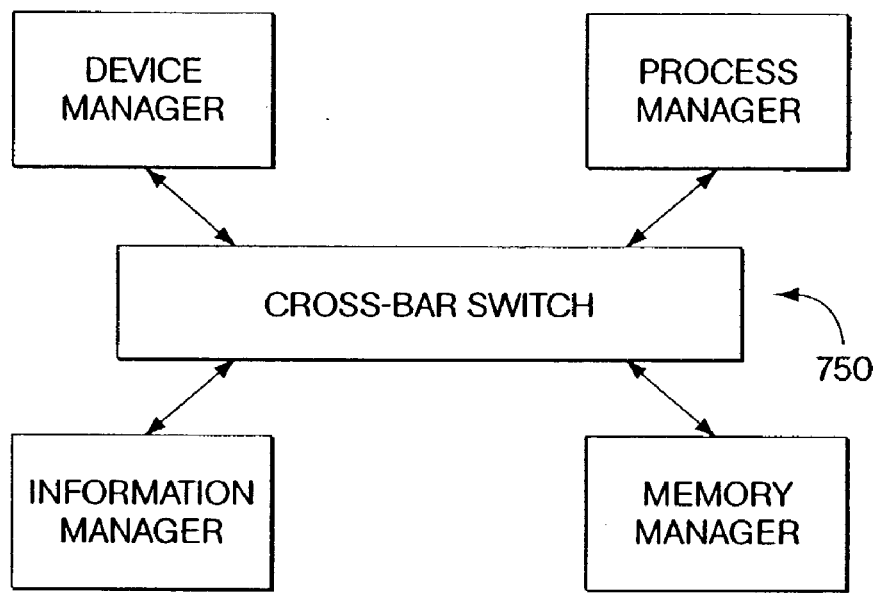
FIG. 7 illustrates a cross-bar switch that connects various Managers in the chip used in a computer system without an operating system in accordance with one embodiment of the invention.
Figure 8:
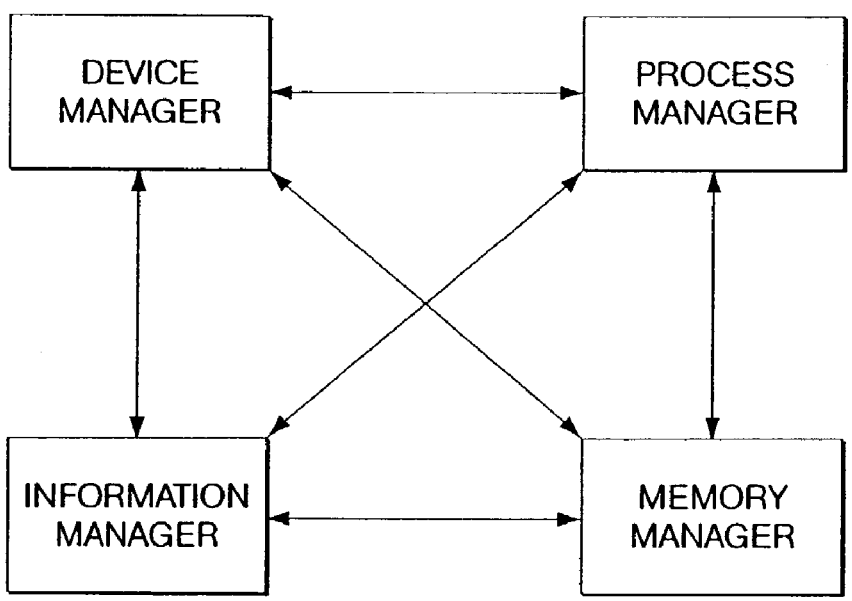
FIG. 8 illustrates a mesh link that connects various Managers in the semiconductor chip used in a computer system without an operating system in accordance with another embodiment of the invention.

The hardware/firmware layer 504 provides the services previously performed by an operating system kernel, discussed above. In one embodiment illustrated in FIG. 6, the hardware/firmware layer 504 takes the embodiment of an integrated semiconductor chip or chip set 600 inserted into the hardware platform. The chip used in the computer system without an operating system interacts with the CPU and various components in the hardware platform layer including input devices 650, output devices 660 and permanent storage devices 670. According to the embodiment, the chip 600 comprises four microcontrollers, preferably digital signal processors (DSPs) 612, 622, 632, 642. Each DSP is associated embedded firmware that contains one of four routines; a device management routine 614, a process management routine 624, a memory management routine 634 and an information management routine 644. These routines are within the knowledge of those skilled in the art of operating system designs. The firmware may be embedded in ROM, erasable programmable ROM (EPROM), Flash memory and the like. A microcontroller and an associated firmware forms one of a Device Manager 610, an Information Manager 640, a Memory Manager 630 and a Process Manager 620, as shown in FIG. 6. The Device Manager 610 is linked directly to and has access to the Input/Output (I/O) devices 650, 660 and permanent storage devices 670. The Information Manager 640 and the Device Manager 610 are linked directly to and have access to the permanent storage devices 670. The Memory Manager 630 is directly linked to and has access to the main memory 206. The Process Manager 620 is directly linked to and has access to the CPU 202. The Managers 610, 620, 630, 640 are connected together so that a Manager can communicate with another Manager or Managers. Various methods of connections may be used such as a cross-bar switch 750 shown in FIG. 7 or a mesh connection shown in FIG. 8. The architecture using the chip in the a computer system without an operating system is inherently robust because each Manager operates independently and is interfaced only with those components and devices applicable to its operation. In addition, interaction with the components and devices is performed at hardware level without an intervening software level such as an operating system that is subject to crashes. Further descriptions of the Managers are now given.

Figure 9:
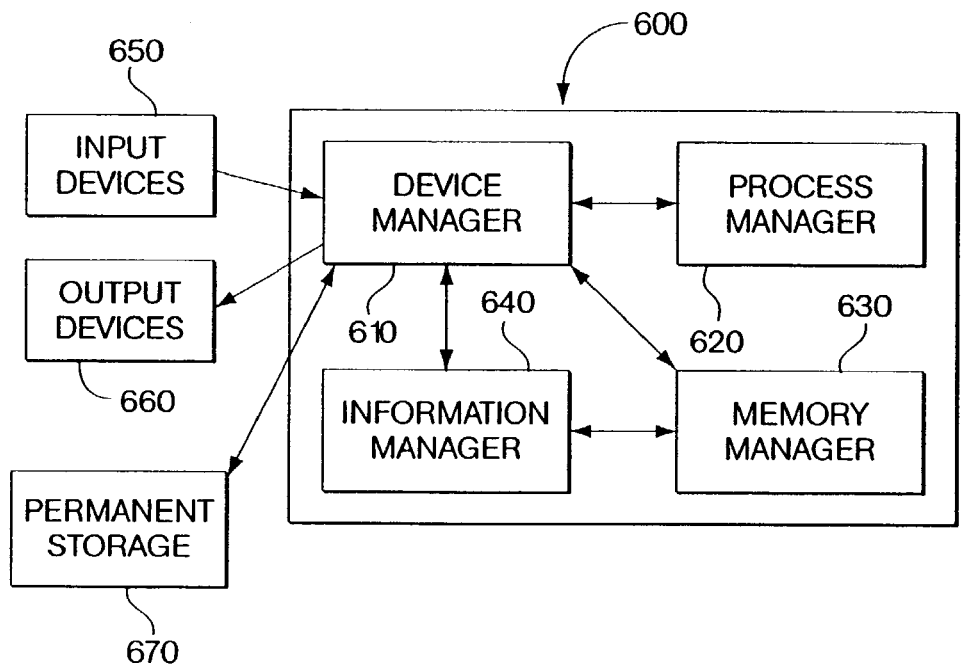
FIG. 9 illustrates Device Manager interfaces in accordance with an embodiment of the invention.
Figure 14:
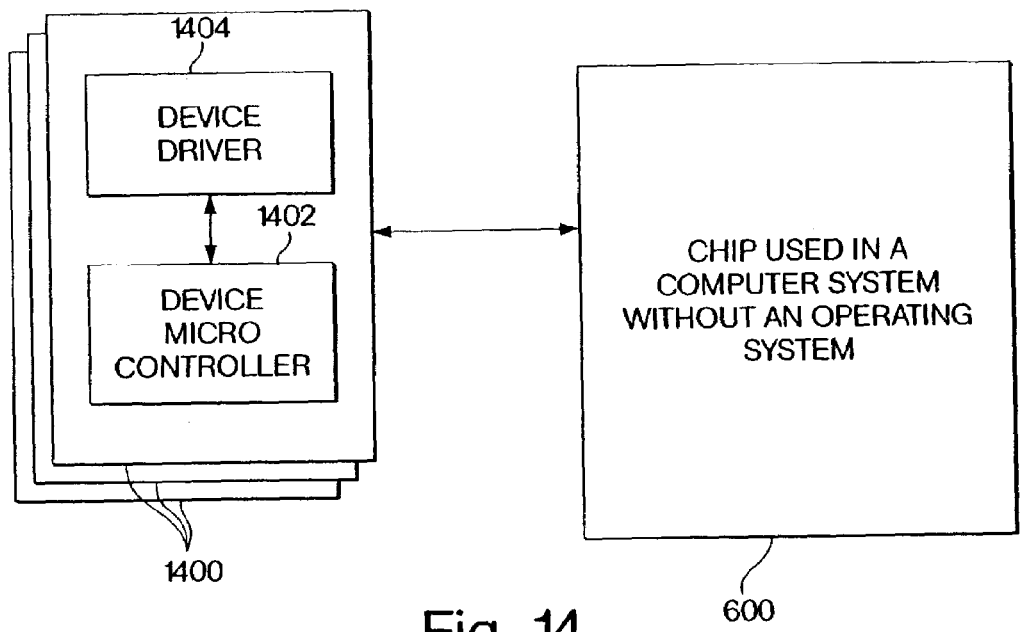
FIG. 14 illustrates smart devices coupled to the is a semiconductor chip used in a computer system without an operating system chip.

With reference to FIG. 6 and FIG. 9, the Device Manager 610 identifies all devices 650, 660, 670 connected to the computer system and establishes their means of connection, control unit functionality, and device capacity and capability as will be apparent with respect to FIG. 14. The device management routine 614 provides the instructions that allow the Device Manager 610 to act as an I/O scheduler by allocating devices 650, 660, 670 to tasks, initiating operations by the device and reclaiming the device on task completion. The user's interaction with the computer's resources is via requests submitted to Device Manager 610 from input devices 650 such as a mouse or a keyboard supported by a graphic user interface (GUI) provided via Device Manager 610 to the user's screen.

Figure 10:
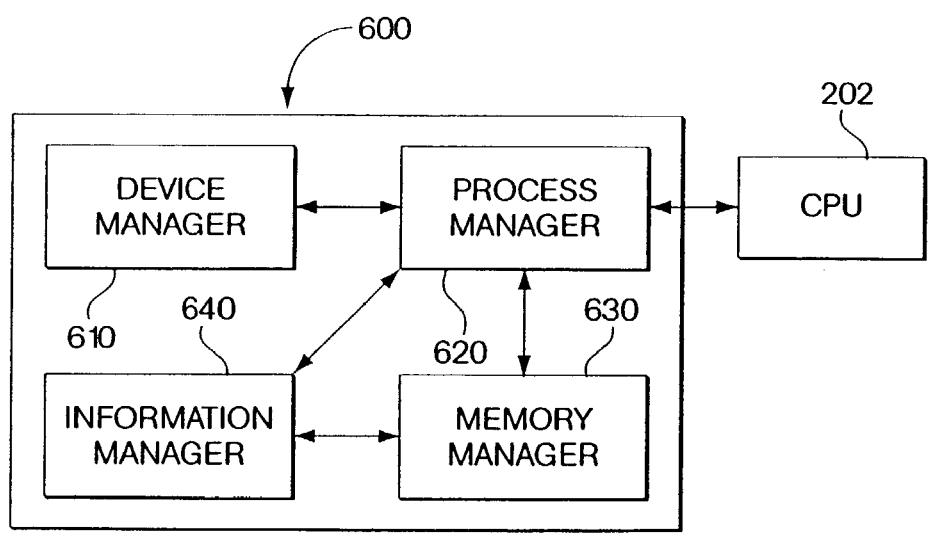
FIG. 10 illustrates Process Manager interfaces in accordance with an embodiment of the invention.

With reference to FIG. 6 and FIG. 10, the Process Manager 620 acts on process requests submitted via Device Manager 610. Using the instructions provided by the process management routine 624, the Process Manager 620 directly allocates CPU 202 resource to each request based on its needs including the allocation of registers within the CPU 202 and main memory 206. The Process Manager 620 will also request the Device Manager 610 to process relevant data transfer to main memory 206 from the permanent storage device 670. Process Manager 620 also provides a continuous tracking of the CPU 202 capacity and the status of processes and will reclaim the CPU 202 for new activities as each process terminates or exceeds allocated resources.

Figure 11:
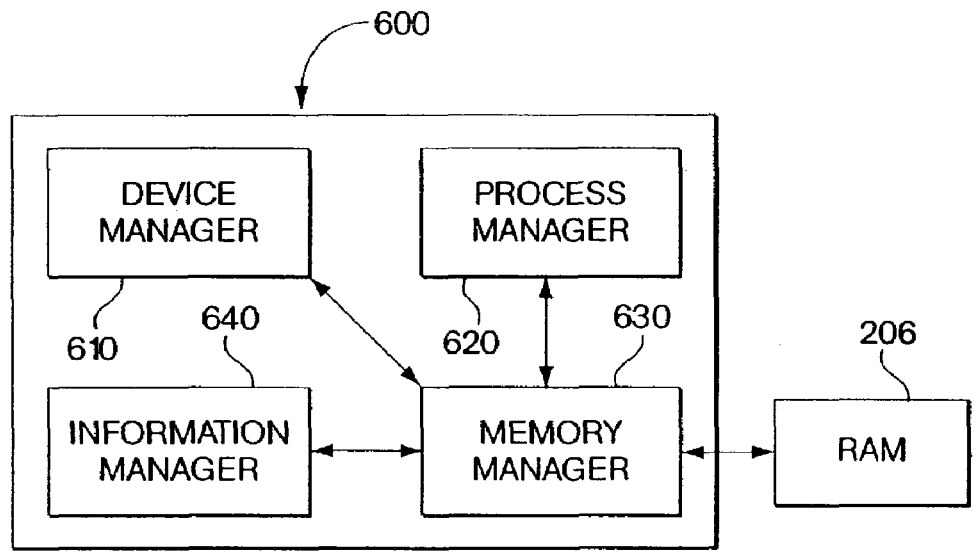
FIG. 11 illustrates Memory Manager interfaces in accordance with an embodiment of the invention.

With reference to FIG. 6 and FIG. 11, The memory management routine 634 provides the instructions for the Memory Manager 630 to allocate memory 206 resources to the Process Manager 620 based on the immediate memory needs of the jobs being controlled by Process Manager 620. The Memory Manager 630 also responds to direct requests via Device Manager 610 for memory 206 resource. The Memory Manager 630 constantly tracks the user and associated amount of each element of memory being utilized and on termination of jobs, reclaims and makes memory resources re-available. Memory Manager 630 logically partitions the memory resource into two areas. One is reserved for resident applications in use (e.g. Microsoft™ Word™) and the other for process requirements (e.g. a datafile being worked on by Excel™ or a program being developed in C++). Applications in use are loaded sequentially into the application memory space. Files and data only occupy the process memory space when they are being operated on and the Memory Manager 630 prioritizes, schedules and maintains an external queue for memory resource.

Figure 12:
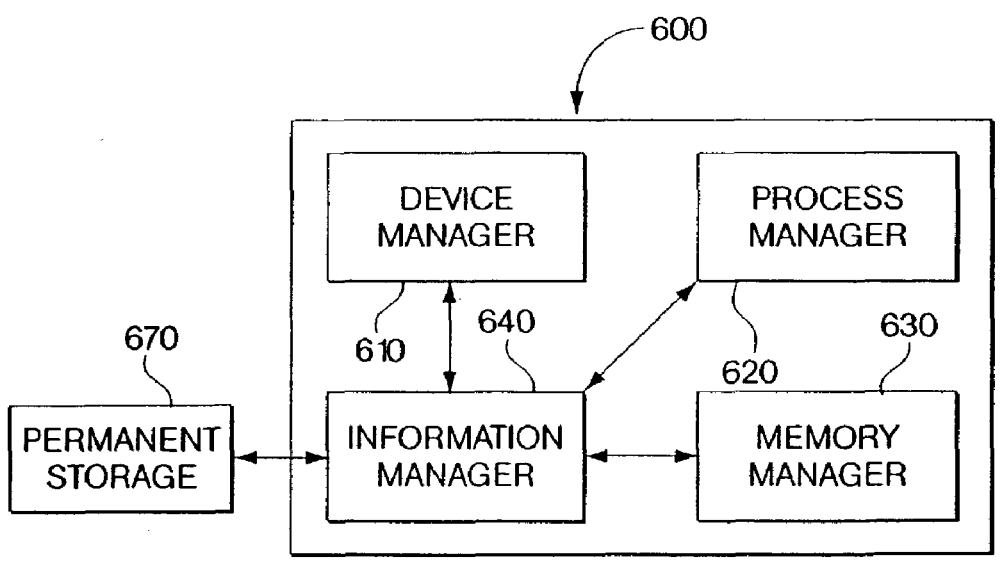
FIG. 12 illustrates Information Manager interfaces in accordance with an embodiment of the invention.

With reference to FIG. 6 and FIG. 12, the information management routine 644 provides the instructions for the Information Manager 640 to provide the means for the user to make decisions about planned and current use of the computer system's facilities by providing a complete information resource record and management capability for the entire system. Using input from the other Managers and directly from connected permanent storage devices 670, it maintains a file management record file in the main memory 206. This contains the location, use and size of all files, the status of all files (i.e. open/close, file type, security levels) and the overall capacities and usage levels of memory 206, input devices 650, output devices 660 and permanent storage devices 670.

Other aspect of the computer architecture includes a graphic user interface (GUI) and an applications program interfaces (APIs). The GUI and API may be implemented as software and stored in the permanent storage device until called by the chip 600 that is used in a computer system without an operating system. For instance, the graphic user interface (GUI) may be contained in the permanent storage device until retrieved by the pertinent Manager during power-up sequence. Designing a GUI is well known in the art and will not be further discussed here. Regarding presently-available application software programs, such as Microsoft™ Office Suite, Lotus Notes™, Corel Draw™, Symantec™ Winfax™ and ACT™, each of these programs require an associated Operating System interface that is written into the application. Thus, the software programmed to a particular Operating System type. To accommodate such presently-available programs within the computer architecture that has eliminated the operating system, a corresponding API to the software is stored in the permanent storage device and is called into main memory when the software is operational to act as an interface between the application software and the chip 600. Alternatively, the APIs may be stored in a web-site and the pertinent API is called by the chip 600 via the modem 246 into the main memory 206 when an associated application program is being loaded into memory 206.

Figure 13:
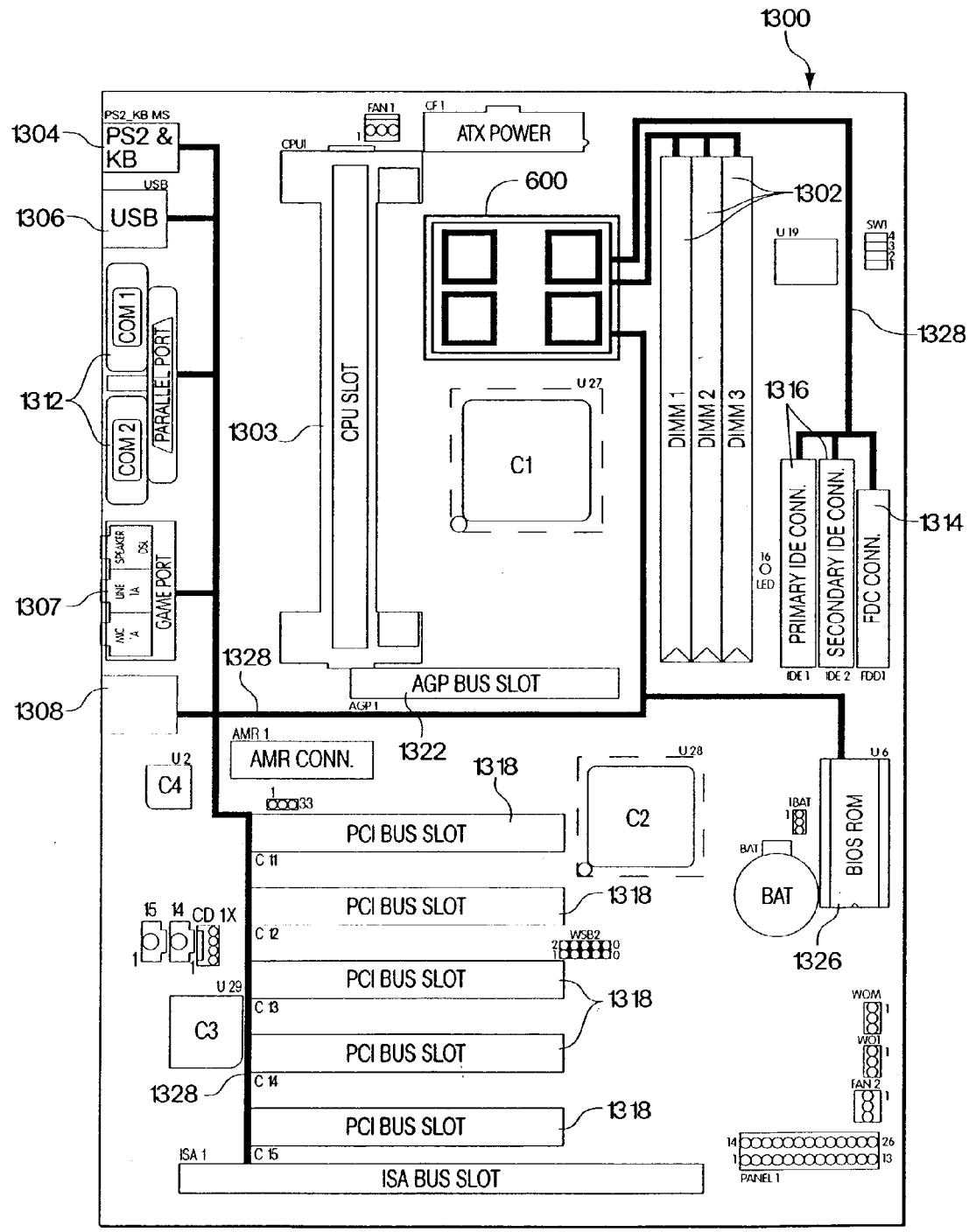
FIG. 13 is an exemplary layout of a computer motherboard containing the chip used in a computer system without an operating system and trace links.

FIG. 13 is a layout of an exemplary computer motherboard 1300 containing the chip 600 that is used in a computer system without an operating system. The motherboard also includes chip sets C1, C2, C3, C4 that contain the various controllers such as the memory controller, direct memory access (DMA) controller, interrupt controller, input/output (I/O) controller, integrated drive electronics (IDE) controller, supporting circuitry and an array of dynamic random access memories (DRAMs) 1302 that constitute the main memory. Also included on the motherboard 1300 is a CPU slot 1303 that is configured to receive the CPU 202 and various peripheral device connectors such as keyboard port 1304, Universal Serial Bus (USB) port 1306, game port 1307, serial port 1308, parallel ports 1312, floppy Drive controller (FDC) connector 1314, primary and secondary IDE connectors 1316 and expansion slots such as Personal Computer Interface (PCI) bus slots 1318, Industry Standard Architecture (ISA) bus slot 1316, and advanced graphics port (AGP) bus slot 1322. The motherboard further includes the BIOS ROM 1326 that contains the BIOS including Power On Self Test (POST) routine. In one embodiment, the BIOS provides the services of a conventional POST, configuration of system level devices and controllers such as I/O interfaces, keyboard controller, video controller, timer, direct memory access (DMA) controller, peripherals interface controller and so forth, and a bootstrap to the chip 600. In accordance with an embodiment of the invention, the peripheral device connectors and the expansion slots are connected to the respective Manager in the chip 600 via trace links 1328. Through the trace links 1328, direct communication occurs between the devices and the chip 600.

Devices are directly connected at a physical level to the Device Manager 610 of the chip 600 and device recognition and management is separated from any information, memory or processing functions. The means by which each device is made available to the chip 600 is through the microcontroller with embedded device driver contained within a device itself.

Figure 15:
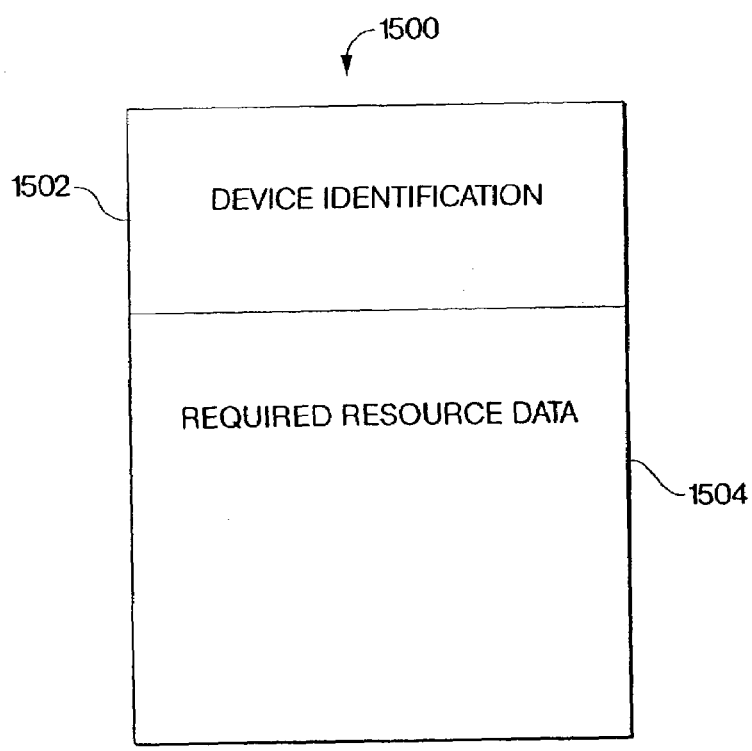
FIG. 15 illustrates a register format in a smart device that includes a serial identification and resource data.

A smart device 1400, illustrated in FIG. 14, contains a device microcontroller 1402 and embedded device driver 1404 within the device 1400 that allows it to configure and perform self diagnostic test as well as operations of the device, hence is smart in the sense that it operates independently without external control source. Smart devices include devices such as disk drives, modem, printer, video monitor and so forth. Smart devices are interfaced with the pertinent Manager in the chip used in the computer system without an operating system to make available the services of the devices. According to one aspect of the invention, at power-up initialization, individual device microcontrollers 1402 within the devices 1400 are activated, each device microcontroller 1402 having a startup address pointing to the embedded ROM contained in the device 1400. The ROM can contain a device driver 1404 that is particular to the device that the device microcontroller 1402 uses to configure and perform self diagnostic test. In one aspect of the invention, each device microcontroller 1402 in the one or more devices 1400 perform the configuration and diagnostics autonomously and simultaneously or substantially simultaneously. If, after the previous procedure, the device 1400 is deemed to be operational, the device microcontroller 1412 sends an identification signal 1500, which is stored in registers, such as the one illustrated in FIG. 15, to the chip 600 used in a computer system without an operating system via the trace link 1328 to indicate availability of the device 1400. The identification signal 1500 may be a string of data bits transmitted serially or in parallel that comprises of device identification bits 1502 and required resource data bits 1504. The signal may conform to the serial identifier and resource data format of the Plug and Play ISA specification. It should be noted that the signal configuration may be in any format standard established with or by device manufacturers. The Device Manager 610, upon receiving the identification signal, recognizes the presence of the device. Because the Device Manager 610 has access to available system resources, the Device Manager 610 identifies the resources required by the device and allocates the appropriate resources to the device. Resource allocation is usually performed in a manner that does not conflict with other devices that require system resources. The resource allocated device is assigned an address that acts as a pointer to the device. It should be noted that because the number of I/O and storage devices and the ability to communicate with them is predetermined as a function of the total peripheral device connectors, expansion slots and associated trace links to the chip 600, in one embodiment, device recognition and logical connectivity can be based on a finite state machine.

As can be seen by reference to FIG. 13, the chip 600 used in a computer system without an operating system is shown as being directly connected to the CPU (CPU slot 1303) and the main memory (memory slots 1302). Thus the CPU 202 and memory 206 (see FIG. 6) can focus entirely on process requirements and multi-tasking management that are performed by the Process Manager 620 and the Memory Manager 630 within the chip 600. As a result, when insufficient memory or CPU capacity is available, then no more processes are added to the system and the request is rejected at the input device level rather than causing a potential crash at the system level. As a result of separating processing and memory management from other routines, the processing speed is a straightforward relationship between the stated CPU 202 capacity, the memory 206 capacity and the transfer rate between and amongst the chip 600, the CPU 202 and the memory 206. This serves to provide robustness in the computer architecture as well as faster interaction between the CPU 202 and memory 206 as the CPU 202 need not be diverted to process other miscellaneous routines.

As there is no resident Operating System in the main memory 204, all of the memory capacity is directly available for the user's tasks at hand. The Memory Manager 630 performs the management of the available memory capacity and queues programs and data awaiting processing externally and ensures that sufficient memory is always available to support a process request. As a result, it is not necessary to continually swap data files, program elements or address map data between storage and memory to continue satisfying a processing requirement. This serves to operate the CPU 202 at optimal capacity because the CPU 202 is not diverted to miscellaneous task of offloading unnecessary files or program elements to make space in the memory for the currently executing program or programs.

The Information Manager 640 maintains an inventory of permanent storage addresses and transfers files into and out of memory on an "as required" and "on completion" basis. Combined with the Memory Manager 630, feature described above results in high-speed data access at both the processing and file management level and minimizes/optimizes the hard disk memory utilization.

It should be noted that, because an entire level of software, that is the operating system, is removed from the computer system, this section reduces the risk of the system being open to virus attack. As a result of the direct physical connection between devices 650, 660, 670, the chip 600, CPU 202 and memory 206, files arriving for processing from permanent storage devices are not exposed to other software interfaces when entering the computer system and therefore avoid potential contamination. Crashes caused by contaminated external files entering an I/O device 650, 660 from outside will occur at device level rather than affecting the entire system. Because of the modularity of the Managers in the chip used in a computer system without an operating system, security measures can be taken at the Information Manager 640, for instance, so that contaminated external files or viruses are filtered and does not expose the files or viruses to the entire system.

Another example of security precaution, when an external communication device (e.g. modem or LAN card) is connected to the Device Manager 610, Data Security Inspection (DSI) software embedded in the Device Manager 610 inspects the file. If the file is suspect, the Device Manager 610 quarantines it in a retention area and flags the file problem to the user. There is no exposure of the relevant permanent storage device to the file thus avoiding system corruption.

Figure 16:
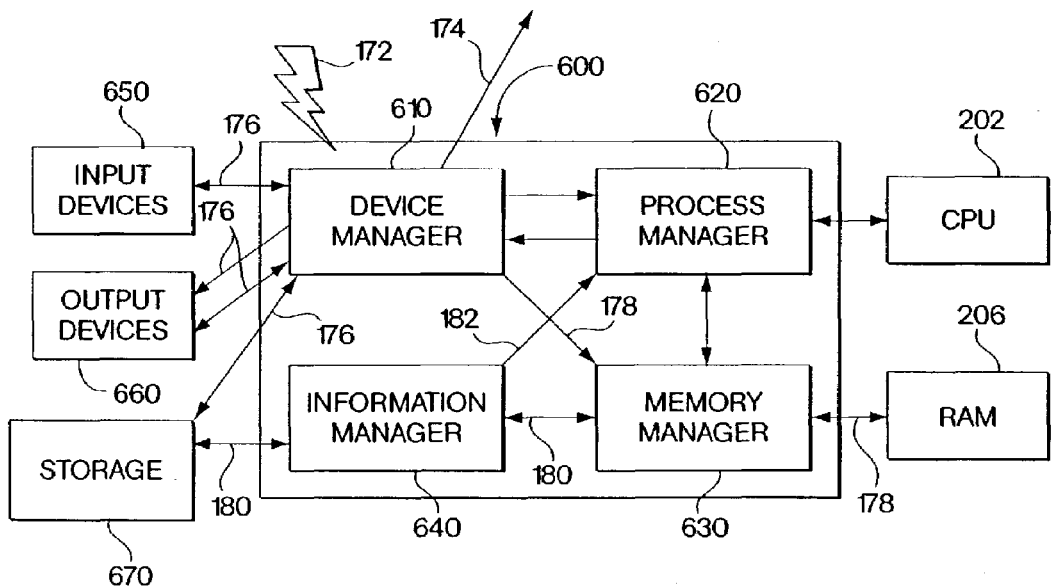
FIG. 16 and FIG. 17 illustrate a power-up sequence in accordance with an embodiment of the invention.
Figure 17:
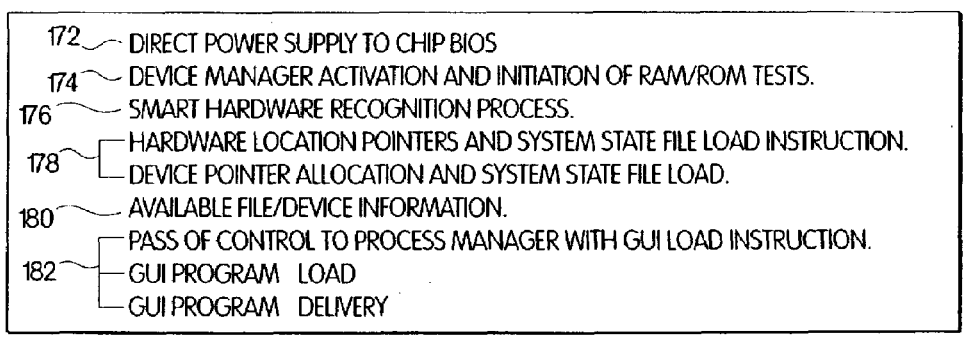

FIG. 16-25 illustrate the example operations performed by the Managers within the chip 600 used in a computer system without an operating system. FIG. 16 and FIG. 17 illustrate a power-up sequence in accordance to one embodiment of the invention. On power-up, at stage 172, the BIOS 1326 (see FIG. 13) is activated to invoke POST routine. In one embodiment a commercially available BIOS such as those from Phoenix Technologies, Ltd. is used, however, the bootstrap sequence is modified to bootstrap to the chip 600. POST conducts a standard memory check and shadows the BIOS into the main memory 206. In stage 174, the BIOS configures the various controllers and bootstrap to the Device Manager 610 in the chip 600. In the meantime, at stage 176, various smart devices such as those described with respect to FIG. 14 and represented by I/O devices 650, 660 and permanent storage devices 670 initiate self-test and configuration and if operational, the smart devices enable an identification signal to indicate their availability. The Device Manager 610 recognizes the existence of each device 650, 660, 670. For devices 650, 660, 670 such as a keyboard, mouse or video monitor, the signal is generated through the motherboard BIOS ROM 1326 or their built-in BIOS communicates directly to the chip 600. For other devices 650, 660, 670 recognition is achieved through electrical connectivity signalled by a signal generator on the device.

At stage 178, the availability, capability and compatibility of each device 650, 660, 670 is enabled. Logical connectivity is based upon the finite state machine concept. Each device 650, 660, 670 is assigned an address in memory that acts as a pointer to the device.

At stage 180, Information Manager 640 loads a file containing the recognized system state on previous shutdown. This contains pointers towards the record fields for all available programs and data files on each permanent storage device 670. At stage 182, the Information Manager 640 passes control to the Process Manager 620 along with an instruction to load the graphical user interface (GUI) from a predetermined fixed drive location. Process Manager 620 displays the GUI via the Device Manager 610 to the screen of the video monitor. The Information Manager 640 icon is displayed on the screen along with icons representing data or program files which the user had screen displayed prior to shut down. The chip 600 used in a computer system without an operating system is now ready to recognize and act on user requests or other inputs. An interrogation of the Information Manager 640 would reveal the GUI, record field file and device record file resident in memory, which would indicate the devices connected and their current status.

Figures 18, 19:
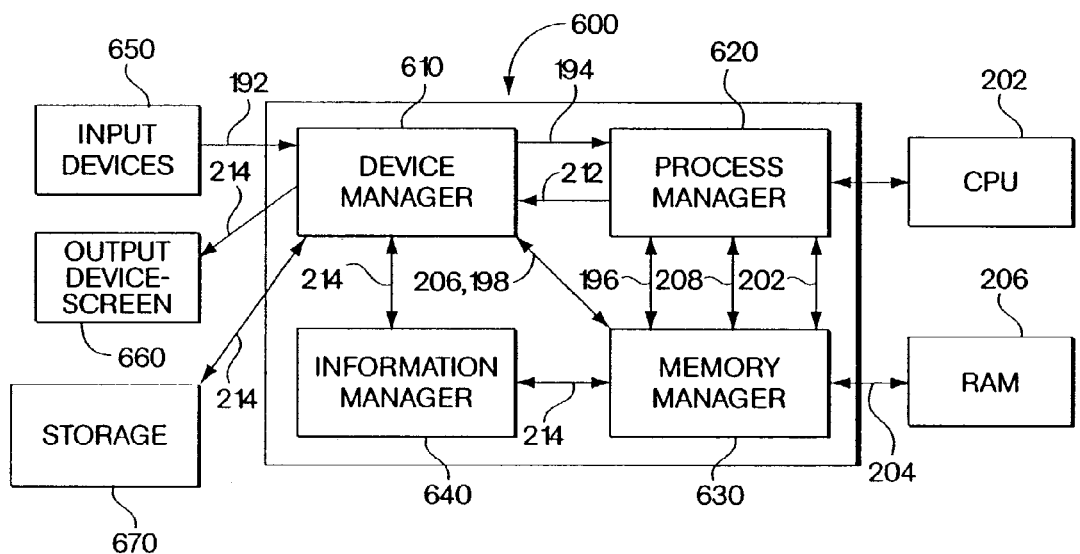
FIG. 18 and FIG. 19 illustrate a sequence for running program/software applications in accordance with an embodiment of the invention.

FIG. 18 and FIG. 19 illustrate an exemplary procedure for running program/software applications. At stage 192, the user inputs this request typically via input device 650 such as mouse and/or keyboard and their interface with Device Manager 610. At stage, 194, the request is sent to Process Manager 620, which in combination with Memory Manager 630, identifies the appropriate files from the register in the memory, which identifies if sufficient memory 206 and CPU 202 resource is available, allocates it and requests the files from Device Manager 610, at stage 196. At stage 198, Device Manager 610 directs the relevant files from the device to memory. At stage 202, program file identification occurs between the Process Manager 620 and the Memory Manager 630. At stage 204, the Memory Manager 630 keeps track of the memory management, allocation of memory used by the programs. The program runs until it is complete or exceeds the resource allocated. Storage requirements during the program run are coordinated between the Device Manager 610 and the Memory Manager 630, at stage 206. In-process file request, queuing and delivery is coordinated between the Process Manager 620 and the Memory Manager 630, stage 208. At stage 212, if further user input is required, Process Manager 620 requests this of the user via the Device Manager 610 interface. The Information Manager 640 provides the user with a picture of the remaining system resources if required, at stage 214.

FIG. 18 and FIG. 19 also illustrate an exemplary procedure of concurrent processing. Inter-process communication and instruction, (e.g. Micrsoft Excel, a spread sheet program that requests the Process Manager 620 to run Microsoft Powerpoint, a presentation program) is handled in a similar manner. At stage 208, an inter-process request queue is created on a permanent storage device 670 and these are then scheduled as input requests in the above manner. As the management of program takes place outside of the CPU 202 and memory 206, the ability to continue to load and run more and more program is a straightforward function of comparing their combined memory 202 and CPU 202 requirement with the programs requirement. The Process Manager 620 and Memory Managers 630 conduct this task. The Memory Manager 630 also provides the Device Manager 610 with the information required to queue data on permanent storage prior to allocation of memory at the time of processing, stage 206. In an operating systemless approach the criteria for subsequently reclaiming the processor resource is pre-defined prior to its allocation to a particular processing requirement. This requirement is either completed and the next process is loaded or it exceeds its pre-allocated resource and is interrupted. Information Manager 640 provides the user with a continuous status indication and allows advance recognition of potential system overload. In addition, an inadvertent attempt to overload the system will simply be met with a message indicating that the process cannot be performed. As the CPU 202 and memory 206 are not engaged at this point, there is no danger of a system crash.

Figures 20, 21:
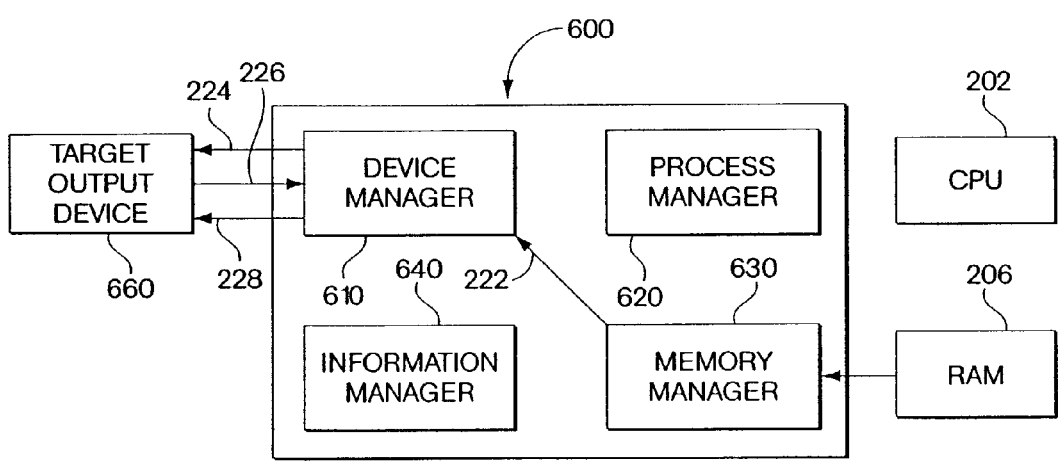
FIG. 20 and FIG. 21 illustrate a sequence for producing output in accordance with an embodiment of the invention.

FIG. 20 and FIG. 21 illustrate an exemplary procedure for producing output (e.g. Printing Information). At stage 222, the application (eg Microsoft Word) generates a print file that is sent by Device Manager 610 directly to the "Queue station" application. This is standard software operating on a first in first out (FIFO) principle. This application is either resident on the hard disk managed directly by an printer controller via the Device Manager 610 connection or ideally, embedded in the printer controller itself. At stage 224, the first job in the queue application is placed in a memory location reserved for print jobs on receipt of a signal from an output device 660 such as a printer that a job is underway. When the printer releases the first job with a signal to Device Manager 610, at stage 226, the next job is loaded into the printer memory, at stage 228. In the event of a fault, the "live job" is simply released from the printer memory. Any difficulties are confined to the printer and there is no danger of a system crash. This same procedure is also of course applicable to a networked printer or other networked device with minimum modification. The queue application routes the data to the IP address of the device through either the LAN connection or network card which would have been identified at start-up. Again, any problems are confined to the particular device and do not impact the CPU 202 or other programmes or files in memory 206.

Figures 22, 23:
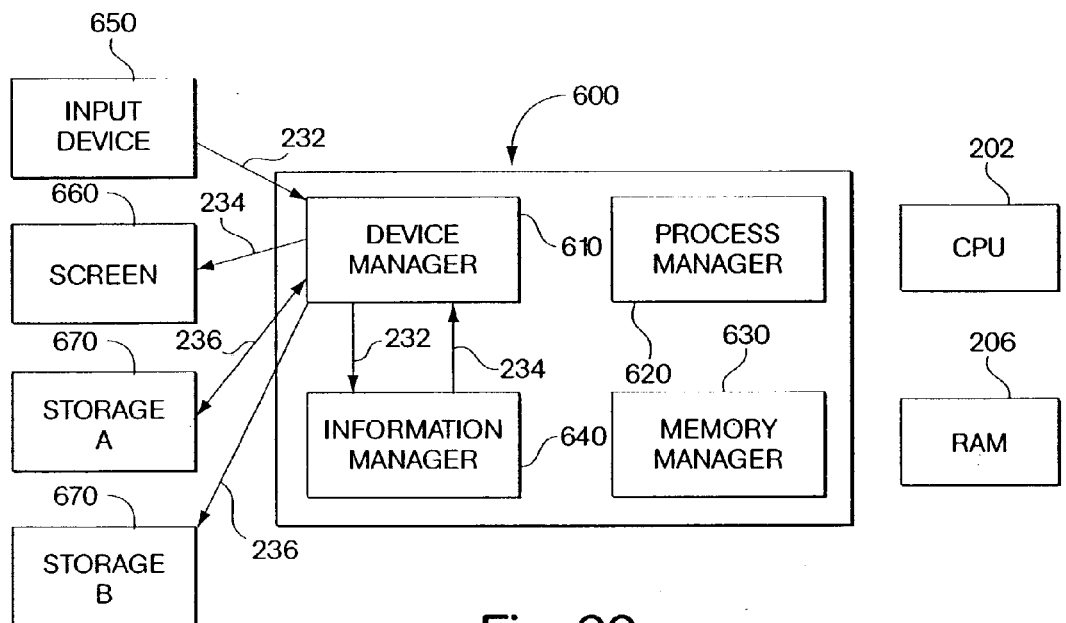
FIG. 22 and FIG. 23 illustrate a sequence for managing files in accordance with an embodiment of the invention.

FIG. 22 and FIG. 23 illustrate an exemplary procedure for managing files. At stage 232, via the GUI, the user interrogates Information Manager 640, which retains information about files resident both on memory 206 and on permanent storage 670. Files contain two elements, a descriptor field containing all relevant information about the file (e.g. whether it is a data or programme file, or whether it is a read only or fully accessible file) and the actual data field. Only the descriptor fields and not the actual data are stored in memory for the use of Information Manager 640. These can be changed directly via Device Manager 610 for secondary storage based files. As a consequence file security levels or type changes or descriptions are directly altered without consuming CPU 202 resource and without accessing the entire file and consuming memory 206 resource. At stage 234, a user requested file transfer is effected following a user request (using e.g. a mouse) to Device Manager 610. This simply passes the file from one storage device 670 to another, at stage 236, and advises Information Manager 640 of the change in device associated with the file. No interaction with the CPU 202 or memory 206 is required. For a user saving a file in use by an application (eg an Excel file in use resident in memory), the file is sent using Memory Manager 630 via Device Manager 610 to the relevant device similar to a normal output request. This process, including any queuing requirement is dealt with in a manner similar to the printing process above.

FIG. 24 and FIG. 25 illustrate in general combined Manager interfaces and interaction of the pertinent Managers to perform various computer system operations. At function 1, a user process request such as to retrieve program, data or file invokes the Device Manager 610. At function 2, output requests, such as print jobs or sending fax via a modem, causes the Device Manager 610 to interact with the pertinent output device 660. A user request such as a file transfer from the permanent storage device 670 invokes the Device Manager 610 to access permanent storage device 670 and retrieve the file. At function 4 in conjunction with function 5, a user request for information such as file information, first invokes the Device Manager 610 that, in turn, determines the nature of the request and passes the request to the Information Manager 640. The Information Manager 640 accesses the permanent storage device that contains the file and retrieves the requested file information. The file information is passed to the Device Manager 610 that passes the information to the user via an output device 660 such as a video monitor. Functions 6–12 pertain to program execution. A user request to execute a program causes the Device Manager 610 to request the Process Manager 620 for a process execution, at function 6. At function 7, the Device Manager 610 interacts with the Memory Manager 630 to load the program into memory 206. At functions 8 and 9, the Device Manager 610 indicates to the Information Manager 640 that a program is to be executed that causes the Information Manager 640 to gather process use and process capacity information, and to gather memory 206 use and memory 202 capacity. At functions 10, the Memory Manager 630 interacts with the Process Manager 620 to provide memory requirements and memory space allocation, among others. At function 11, the Process Manager 620 initiates the CPU 202 to begin execution of the program while continually controlling and monitoring the CPU 202 execution cycles. In the meantime, the Memory Manager 630 continually controls and monitors memory 206 usage and capacity, and memory 206 allocation.

Thus, providing an firmware/hardware layer that eliminates the need for an operating system and making minor modification to the computer motherboard provides for a revolutionary new interface at the hardware level between the user, the computer hardware resource and the devices. It satisfies all user requirements traditionally handled by an Operating System in a faster, cheaper, more robust and more straightforward fashion, eliminating the need for an Operating System. The elimination of the Operating System also relieves Device Manufacturers and Application providers from platform dependence, making future development more straightforward. For instance, Device Manufacturers may produce smart devices that contain a device microcontroller and embedded device drivers that eliminate reliance of the operating system. Application providers may produce their own APIs that optimally runs their software without concerns of the interface rules set by the operating system. While various embodiments of the application have been described, it will be apparent to those of ordinary skill in the art that many more embodiments and implementations are possible within the scope of the invention. Accordingly, the invention is not to be restricted but should be read in light of the attached claims and their equivalents.

What is claimed is:

1. A computer system for use with a device, the system comprising:
   a central processing unit (CPU);
   a main memory;
   at least one device interface configured to be coupled to the device and to receive process requests from the device;
   a further unit comprising:
      a first microcontroller module;
      a first memory containing a first set of instructions configured to cause the first microcontroller module to manage CPU operations and to cause the first microcontroller to allocate CPU resources to each of the process requests received by the at least one device interface;
      a second microcontroller module in communication with the first microcontroller and configured to receive the process requests from the at least one device interface;
      a second memory containing a second set of instructions configured to cause the second microcontroller module to manage the device, and to identify the device and a means of connection used by the device;
      a third microcontroller module in communication with the first microcontroller;
      a third memory containing a third set of instructions configured to cause the third microcontroller module to manage memory operations;
      a fourth microcontroller module in communication with the first microcontroller;
      a fourth memory containing a fourth set of instructions configured to cause the fourth microcontroller module to manage data operations,
      wherein the CPU and the further unit both reside on a motherboard; and
   a plurality of trace links connecting the further unit to the CPU, the main memory, and the device interface to facilitate communication between the further unit, the CPU, the main memory, and the device.

2. The computer system of claim 1, wherein the system further comprises firmware that contains the first and second instruction sets.

3. The computer system of claim 1 wherein the computer system is substantially free of an operating system.

4. The computer system of claim 1 wherein the instructions contained by the second memory are further configured to cause the second microcontroller module to recognize, during startup of the computer system, the existence of the device.

5. The computer system as in claim 1, wherein the plurality of microcontroller modules in the further unit are connected together to communicate with each other.

6. The computer system as in claim 5, wherein the further unit includes a cross-bar switch to connect the plurality of microcontroller modules.

7. The computer system as in claim 1, wherein the device comprises:
   a fifth microcontroller module in communication with at least the second microcontroller; and
   a fifth memory module containing a fifth set of instructions configured to cause the fifth microcontroller module to test the device and if the device is operational the fifth set of instructions is configured to cause the fifth microcontroller module to signal at least the second microcontroller to indicate availability of the device.

8. The computer system as in claim 7, wherein
   the fifth set of instructions in the fifth memory is further configured to cause the fifth microcontroller module to signal at least the second microcontroller module to indicate availability of the device includes sending device identification and required resource data.

9. The computer system as in claim 8, wherein
   the second set of instructions in the second memory is further configured to cause the second microcontroller module to receive the signal indicating availability of the device and allocating available resources to the device.

10. The computer system as in claim 1, wherein the microcontroller modules are on a single motherboard.

11. The computer system as in claim 1, wherein the microcontroller modules are on a single chip.

12. A computer system for use with a device, the system comprising:
    a central processing unit (CPU);
    a main memory;
    an interface configured to be coupled to the device and to receive process requests from the device;
    a further unit comprising:
       a first microcontroller module having firmware that contains a first set of instructions configured to cause the microcontroller to manage CPU operations and to cause the first microcontroller module to allocate CPU resources to each of the process requests received by the interface,
       a second microcontroller module in communication with the first microcontroller and configured to receive the process requests from the interface, the second microcontroller module having firmware that contains a second set of instructions configured to cause the second microcontroller to manage the device and to identify the device and a means of connection used by the device;
       a third microcontroller module in communication with the first microcontroller and having firmware that contains a third set of instructions configured to cause the third microcontroller to manage memory operations;
       a fourth microcontroller module in communication with the first microcontroller and having firmware that contains a fourth set of instructions configured to cause the fourth microcontroller to manage data operations, and a plurality of trace links connecting the further unit to the CPU, the main memory, and to the interface for the device to facilitate communication between the further unit, the CPU, the main memory, and the device.

13. The computer system as in claim 12 wherein the further unit includes a cross-bar switch to connect the plurality of microcontroller modules.

14. The computer system as in claim 12, wherein the system further comprises:

a device, wherein the device comprises:

a fifth microcontroller module in communication with at least the second microcontroller module; and a fifth memory containing a fifth set of instructions configured to cause the fifth microcontroller module to test the device and if the device is operational the fifth set of instructions is configured to cause the fifth microcontroller module to signal at least the second microcontroller module to indicate availability of the device.

15. The computer system of claim 12 wherein the computer system is substantially free of an operating system.

16. The computer system of claim 12 wherein the second set of instructions further causes the second microcontroller module to recognize, during startup of the computer system, the existence of the device.

* * * * *